(12) United States Patent
Meister

(10) Patent No.: US 7,257,965 B2
(45) Date of Patent: Aug. 21, 2007

(54) TWO-STAGE EVAPORATION SYSTEM COMPRISING AN INTEGRATED LIQUID SUPERCOOLER AND A SUCTION VAPOUR SUPERHEATER ACCORDING TO FREQUENCY-CONTROLLED MODULE TECHNOLOGY

(75) Inventor: Remo Meister, Merligen (CH)

(73) Assignee: BMS-Energietechnik AG, Wilderswil (CH)

( * ) Notice: Subject to any disclaimer, the term of this patent is extended or adjusted under 35 U.S.C. 154(b) by 274 days.

(21) Appl. No.: 10/525,165

(22) PCT Filed: Aug. 28, 2002

(86) PCT No.: PCT/CH02/00470

§ 371 (c)(1),
(2), (4) Date: Feb. 22, 2005

(87) PCT Pub. No.: WO2004/020918

PCT Pub. Date: Mar. 11, 2004

(65) Prior Publication Data

US 2006/0090506 A1 May 4, 2006

(51) Int. Cl.
*F25B 41/00* (2006.01)
(52) U.S. Cl. .......................... 62/513; 62/515
(58) Field of Classification Search ............... 62/125, 62/505, 513, 515
See application file for complete search history.

(56) References Cited

U.S. PATENT DOCUMENTS

| 5,092,138 | A |   | 3/1992 | Radermacher et al. |
| 5,243,837 | A |   | 9/1993 | Jung et al. |
| 6,082,448 | A | * | 7/2000 | Haussmann ................. 165/174 |
| 6,185,946 | B1 |  | 2/2001 | Hartman |
| 6,220,337 | B1 |  | 4/2001 | Chen et al. |
| 6,263,964 | B1 |  | 7/2001 | Yang |
| 6,315,037 | B1 | * | 11/2001 | Haussmann ................. 165/174 |

FOREIGN PATENT DOCUMENTS

| DE | 298 00 048 U | 4/1998 |
| DE | 198 05 285 A | 8/1999 |
| GB | 2 175 679 A | 12/1986 |

\* cited by examiner

*Primary Examiner*—Melvin Jones
(74) *Attorney, Agent, or Firm*—The Webb Law Firm

(57) ABSTRACT

The aim of the invention is to improve a refrigerating installation in such a way as to achieve high operating reliability, and savings in terms of energy and cost, in cooling circuits containing a cooling agent (cooling sols). To this end, disclosed is a refrigerating installation provided with frequency-controlled cooling units in the form of modules comprising an integrated two-stage evaporator provided with a liquid supercooler and a suction vapour superheater.

22 Claims, 10 Drawing Sheets

TWO-STAGE EVAPORATION SYSTEM COMPRISING AN INTEGRATED LIQUID SUPERCOOLER AND A SUCTION VAPOUR SUPERHEATER ACCORDING TO FREQUENCY-CONTROLLED MODULE TECHNOLOGY

BACKGROUND OF THE INVENTION

1. Field of the Invention

Cooling and freezing plants, refrigeration technology, refrigeration machine for cooling and heating operation, refrigeration plants, refrigeration sets, heat pumps, energy recovery, waste heat utilization: modular technology which is used to cool and/or heat various media, such as liquids, air, gases and other energy carriers.

2. Description of Related Art

Frequency-controlled refrigerant compressors, refrigeration sets, supercooling, energy storage are known individually but not in combination as proposed here, and in this combination it is also not known to use the newly discovered two-stage evaporator with integrated liquid supercooling and suction steam superheating, which is also applied for as part of the patent.

The prior art has disclosed plants with single-stage supercooling, suction steam superheating, direct evaporation plants for refrigerant, heat-transfer medium cooling plants (secondary coolers), cascade cooling plants, booster cooling plants, cooling plants with dry expansion (dry evaporator), thermosyphon systems (flooded evaporators) and refrigeration sets.

The use of frequency-controlled refrigerant compressors, modular structure of refrigeration sets, supercooling and energy storage have not hitherto served to allow the use of such small refrigerant compressors as those proposed here and thereby to cover very high power peaks in terms of the required refrigeration demand directly via the mechanical refrigeration power that is generated.

Only the combination of two-stage evaporation with integrated liquid supercooling and suction steam superheating (4/5) is frequency-controlled modular technology (10/11) with multistage supercooling (6) guarantees that the following objectives are achieved.

SUMMARY OF THE INVENTION

It is an object of the invention, in cooling/freezing plants, refrigeration machines for cooling and heating operation, refrigeration plants, refrigeration sets, heat pumps and all plants using refrigerant and refrigeration-transfer media, to achieve the following objectives: low energy consumption, high operational reliability, high availability of the refrigeration, low maintenance costs, rapid reaction time (until the damage is eliminated, irrespective of the nature of the damage), simple plant technology, simple system structure, low investment costs, protection of investment, high versatility (with regard to products, refrigerant, etc.)

To drastically increase the COP values and operational reliability, to drastically reduce the maintenance, operating and investment costs, the possibility of using very small refrigerant compressors (1) in relation to the maximum refrigeration power which can be released, to generate the refrigeration power over the majority of the duration of a standard cooling process with very high levels of efficiency and very low refrigerant compressor powers and thereby to cover very high refrigeration power peaks (ratio of minimum demand to average demand and maximum demand for refrigeration power considered over a short or long period of time).

Furthermore, the above objectives are to be achieved with a very small number of components (9) and auxiliary refrigeration substances being used and a minimum of refrigerant being required.

To generate and store (12) the refrigeration energy at times at which little refrigeration energy is required (27).

To use this energy (27) to cover peak refrigeration powers and thereby to obtain a more uniform outlay on and demand for energy and more uniform operating states (longer run times with fewer ON/OFF cycles of the compressors).

The invention is based on the combination and further development of the above systems in refrigeration plants (11) which are of modular design (refrigeration sets).

We understand the term modular technology (11) (refrigeration sets) as meaning a refrigeration plant which is ready to connect for each module (11) (refrigeration set), the modules (11) being connected in parallel with one another to form a refrigeration system.

Different power levels of modules (11) are used, and it is possible for a plurality of modules (11) to be connected to a refrigeration system.

Depending on demand, it is possible for a system to start with one or more modules (11) and for further modules (11) to be added at a later stage.

It is possible for a plurality of systems to be combined with one another, and the individual modules (11) are portable and ready for connection.

The use of frequency control (11) and the fact that the modules (11) are connected in parallel make it possible to cover peak loads for processes that are currently standard with significantly smaller refrigerant compressors (1).

The refrigerant compressor power is significantly increased by the use of a special, two-stage evaporator with integrated liquid supercooling and suction steam superheating (4/5).

The modular technology (11) increases the availability of the refrigeration that is generated significantly compared to standard individual or compound plants.

In the event of a refrigeration module (11) failing, the refrigeration power which it is no longer producing is partially or completely compensated for by increasing the rotational speed of the other refrigerant compressors (frequency control) (10).

The use of the special two-stage evaporator technology with integrated liquid supercooler/suction steam superheater (4/5) and a two-stage or multistage supercooling (6) has enabled us to generate and store (12/27) some of the refrigeration power required during times at which there is little demand for refrigeration and to increase the power by means of the external supercooling stage (6/27) to cover peak loads at times of high demand for refrigeration, without a lower evaporation temperature (31) being required during storage.

The stored refrigeration energy (12/27) in this case serves for the liquid supercooling of the refrigerant (external supercooling) (6/27).

Other energy sources can likewise be used for refrigerant supercooling (6).

A further stage of the liquid supercooling of the refrigerant is realized by means of evaporation of the refrigerant and suction steam of the refrigeration plant (internal supercooling) (5).

The invention of this evaporation process with liquid supercooling and suction steam superheating (4/5) is based on the following:

Dry expansion systems (dry evaporator) with injection valve, in which a superheated and gaseous refrigerant leaves (20) the evaporator, are known.

Thermosyphon systems (flooded evaporator), in which liquid refrigerant is passed into the evaporator and superheated, gaseous or non-superheated refrigerant provided with liquid fractions flows into a separator, and from there is passed in gaseous form without liquid fractions to the refrigerant compressor, are known.

Refrigeration systems in which heat exchange between gaseous and liquid refrigerant is realized in order to supercool the liquid and to superheat the suction steam (liquid/suction steam heat exchanger) are known.

Combinations with waste heat utilization and cascade refrigeration plants are known.

What is novel in our invention is that an evaporation system with dry expansion is used as flooded evaporator (4), in which the refrigerant leaves (21) the evaporator with liquid fractions in the first stage.

A further novelty of our invention is that the refrigerant enters a second evaporation stage (5/21) (dry evaporator) as a liquid/gas mixture with a high gas fraction, and in this second evaporation stage residual evaporation takes place with subsequent high superheating of the refrigerant (22) and simultaneous supercooling of the liquid refrigerant on the second side of the heat exchanger (23).

A further novelty of our invention is that the expansion valve (2) used, which is installed outside or inside the evaporator, limits the level of the suction vapor temperature at the inlet of the refrigerant compressor (1/22) and at the same time controls the power of the internal supercooling (5/23) as a function of the available evaporator power (5/24) of the first stage (4/25).

A further novelty of our invention is also the interaction of all these components, such as modular design (11) (refrigeration set), frequency control of the refrigerant compressors (10), parallel connection of the refrigerant compressor cycles, two-stage evaporation with internal liquid supercooling and suction steam superheating (4/5), two-stage or multistage supercooling (5/6), shift and storage of the refrigeration energy from times of low demand to times of high demand (12/27), integrated waste heat utilization (7/8), with higher temperatures for waste heat utilization (7/8/26) being available on account of the internal supercooling (5/23).

Combinations of all types of waste heat utilization, cascade and emergency operation at module, plant or system level are possible.

The demand imposed on the modular technology (11) are an extremely high operational reliability, low operating costs, low maintenance costs, simple plant engineering, ease of adapting power to the refrigeration power required (expansion possibilities) and simple and flexible adaptation to possible waste heat utilizations (7/8).

Energy saving at three levels is realized through multistage supercooling (5/6), through power shift (for example from day to night (12/27)) and through frequency control (10), all of which leads to low operating costs.

Additional optimizations to the operating costs are achieved by lower liquefaction temperatures at night, by higher evaporation temperatures (cold brine temperature rise), by higher gas outlet temperatures (waste heat utilization (7/8/26)), by better efficiencies (over-dimensioned plants do not operate optimally in the part-load range).

Further operating cost optimizations are the negligible pressure drops in the lines, a possible partial current shift (from day to night) (12/27), which is not at the expense of a lower evaporation temperature (31), a uniform run time of the refrigerant compressors (1)—few on/off cycles, which is additionally boosted by the generation of the supercooler power (6/27) at night (permanent operation of the refrigerant compressors (1) is desired, depending on the process), low and reduced start-up current on account of the small number of on/off cycles, frequency converter (10) and smaller refrigerant compressors (1), and high COP values (ratio of electrical energy to refrigeration energy).

When failure of only part of the system occurs, the remaining modules (11) take over responsibility for some of the refrigeration power which is missing in the event of a module failing via frequency conversion (10).

Rapid reaction time in the event of part of a plant failing, since the entire module (11) can be exchanged and the repair carried out in the workshop.

Simple plant engineering (11) since there is no need for any specialists.

High availability on account of a plurality of modules (11) (refrigeration sets).

In the event of the ice store (12/27) failing, emergency cooling for the supercooling (6/27) is realized, for example, using mains water.

In the event of the recoolers (13) failing, emergency cooling for the liquefiers (3) is realized, for example, using mains water.

Extremely small refrigerant compressors (1) in order to cover a required peak refrigeration power significantly simplify the refrigeration plant engineering.

In addition, there are the advantages of smaller recoolers (13), the fact that no oil and refrigerant shifts are possible, a low oil and refrigerant content, a small number of items of refrigeration apparatus (9), more simultaneous waste heat utilization (7/8), integration of freezing plants which is possible at any time (cascade operation), emergency cycles (supercooling 6/27)/condensation (3)) which are realized outside the refrigeration cycles, suction steam temperatures at the refrigerant compressor inlet (1/22) and liquid blasts which are under control.

Small system units (11) (refrigeration set) have small components (9/1/2/etc.) and therefore low component prices, short shutdown times and a high availability of components of this type.

In the event of a module (11) failing, the other modules (11) take over responsibility for some of the missing refrigeration power via frequency conversion (10).

Short reaction times for eliminating a fault, since standardized modules (11) are held in stock.

Longer service life of the refrigerant compressors (1) on account of a small number of on/off cycles.

Basic supply can be extended on demand if the infrastructure (lines, etc.) are installed for the final size.

The site at which the plants are located can be changed without problems on account of the fact that the modules (11) (refrigeration sets) are portable.

The plants are made independent of product by virtue of the fact that modules can be constructed using different components (refrigerant, refrigerant compressor (1), heat exchanger (3/4/5/6/7/8), etc.).

Regulations relating to pressure, refrigerant, filling quantities, etc. can be satisfied in a simpler and more efficient way using small units (11) produced in workshops.

Further investment advantages are simple plant engineering (11) and the fact that specialists are not required.

DETAILED DESCRIPTION OF THE INVENTION

Figure 1:
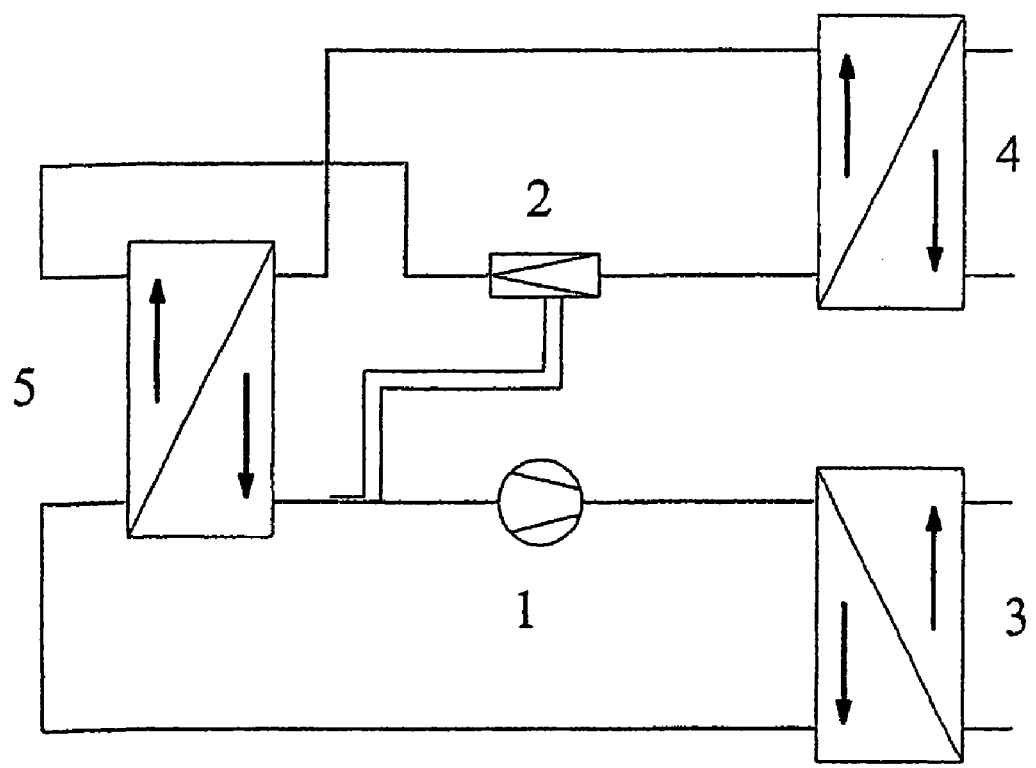
FIG. 1: Minimum possible solution with two independent heat exchangers (4/5)

A refrigeration module (refrigeration set) (11) substantially comprises one or more:

liquefiers (3), liquid supercoolers (6), liquid supercoolers/suction steam superheater evaporators (5) (dry evaporator second stage), evaporators (4) (flooded evaporator, first stage), refrigerant compressors (1), injection valves (2), frequency converters (10), refrigerant, auxiliary refrigeration substances and oil (9).

A module (11) (refrigeration set) optionally additionally includes one or more condensers (7/8), one or more waste heat utilization exchangers (7/8), further supercoolers, viewing windows (9), driers (9), filters, valves, safety equipment, shut-off equipment, collectors (9), oil pumps, distribution systems (9), electrical and control parts (9), auxiliary refrigeration substances, etc.

The heat exchangers (3/4/5/6/7/8) can be piped up as individual components or designed as combined heat exchangers.

The injection valve (2) is mounted upstream of the evaporator (4) or in the evaporator (4/5) (first evaporation stage).

If the injection valve (2) is mounted upstream of the evaporator (4), the measured value for limiting the suction steam is taken at the suction line leading to the refrigerant compressor (1/22). Alternatively, the measured values for the supercooled liquid (28), the high pressure upstream of the injection valve (2/29) and the suction steam pressure downstream of the injection valve (2/30) are likewise available for controlling the two-stage evaporator with integrated liquid supercooler/suction steam superheating (4/5).

Figure 4:
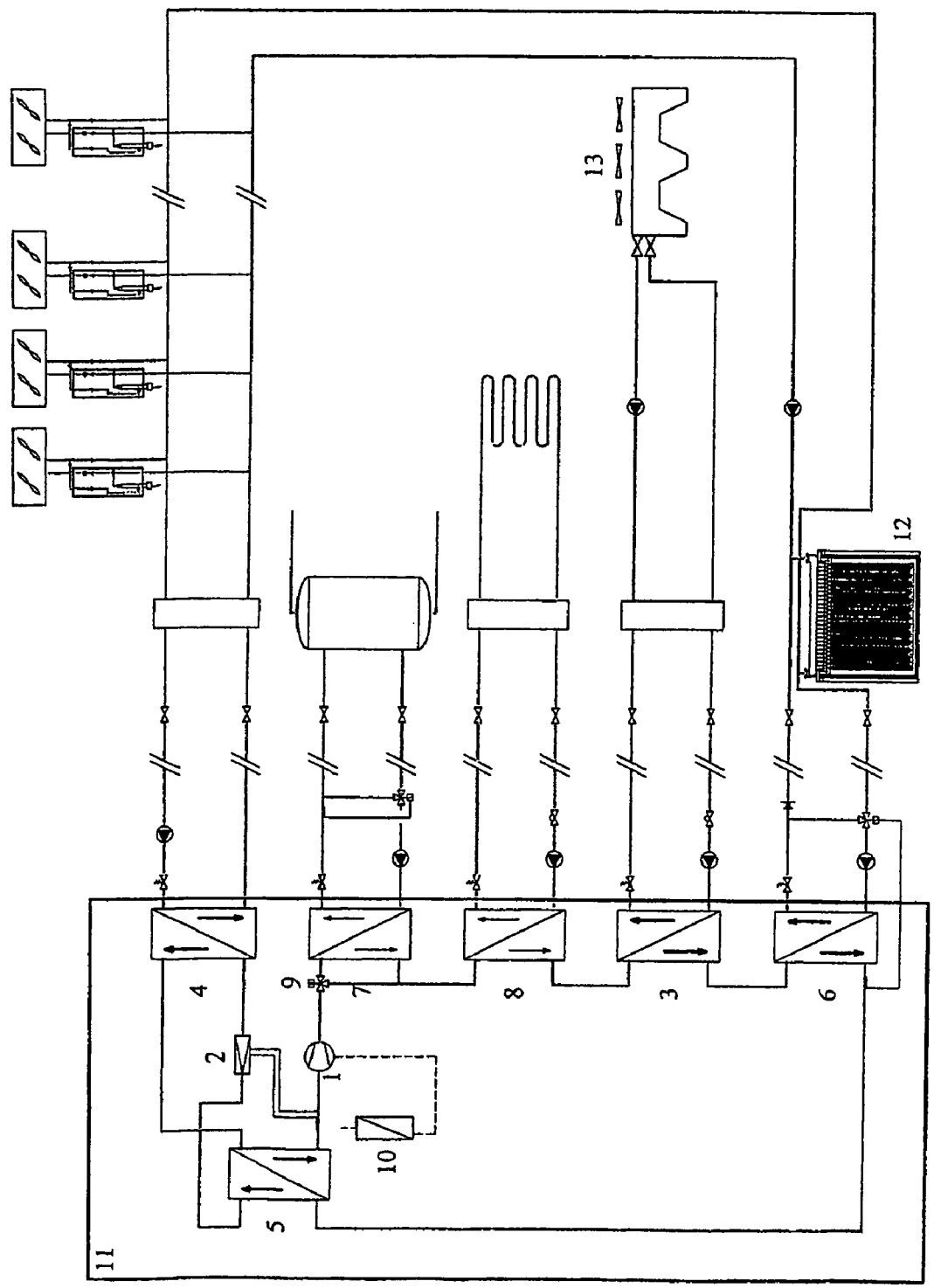
FIG. 4: Possible system incorporation (one possible variant, not exhaustive)
Figure 5:
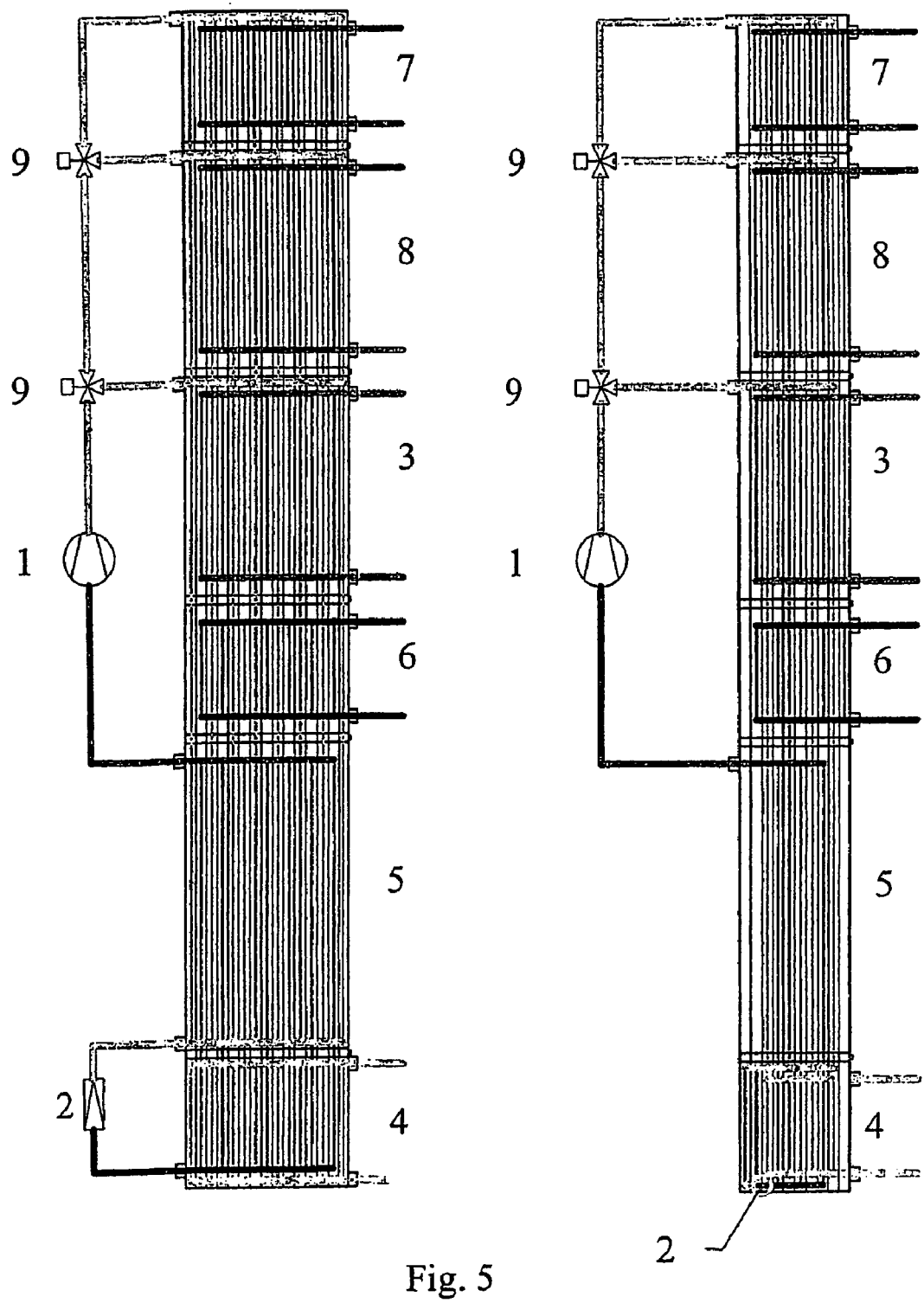
FIG. 5: A combined-cycle plate-type heat exchanger (3/4/5/6/7/8) as two-stage evaporator (4/5) with integrated liquid supercooling (5) and suction steam superheating (5), liquefier/condenser (7), liquefier/-condenser (8), liquefier/recooler (3) and supercooler first stage (6) and with external or internal injection valve (2).
Figure 6:
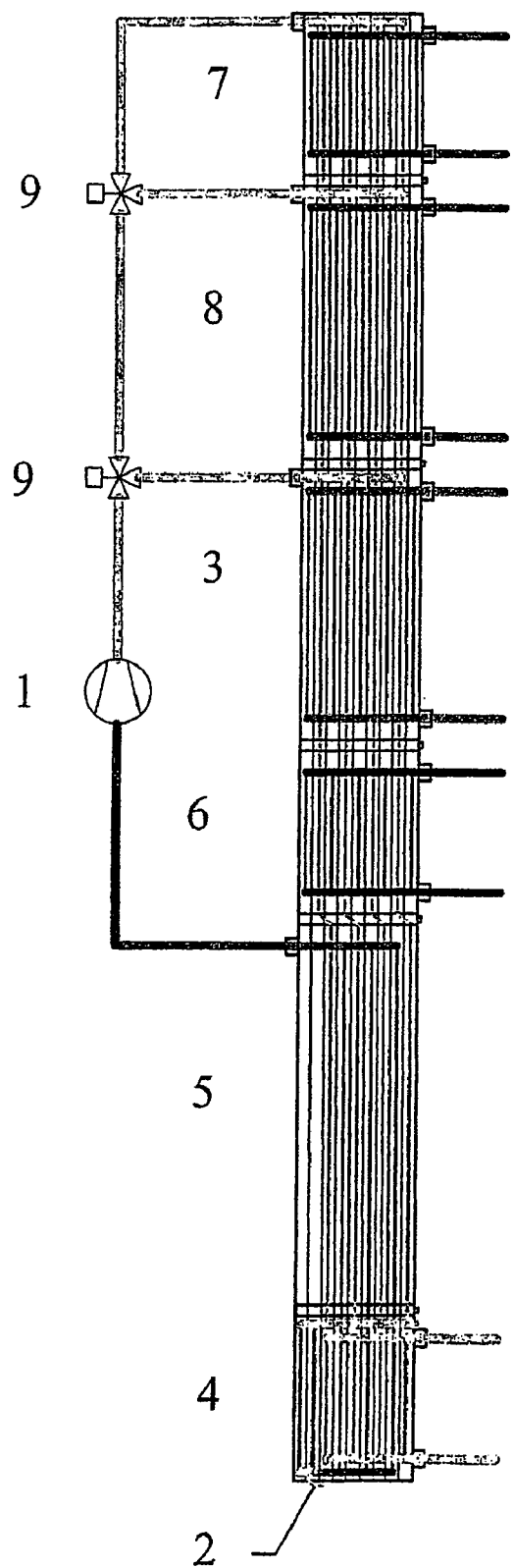
FIG. 6: New development of a combined-cycle plate-type heat exchanger (3/4/5/6/7/8) as two-stage evaporator (4/5) with integrated liquid supercooling (5) and suction steam superheating (5), liquefier/condenser (7), liquefier/-condenser (8), liquefier/recooler (3) and supercooler first stage (6) and with internal injection valve (2) of different design.
Figure 7:
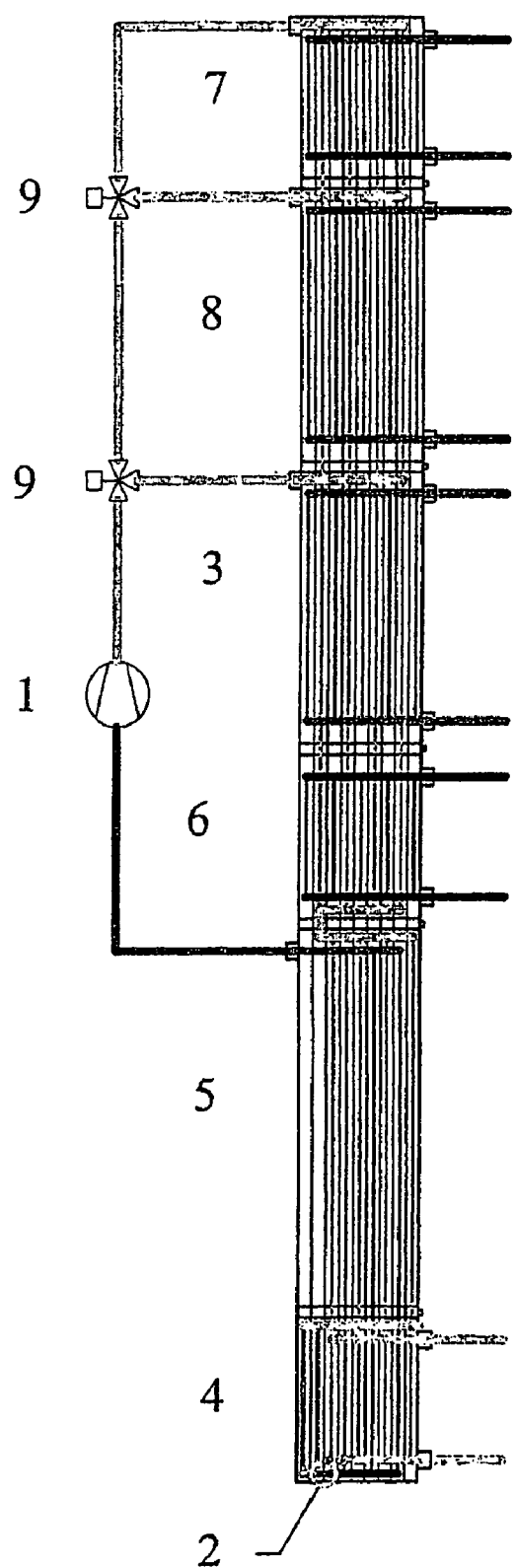
FIG. 7: A combined-cycle plate-type heat exchanger (3/4/5/6/7/8) as two-stage evaporator (4/5) with integrated liquid supercooling (5) and suction steam superheating (5), liquefier/condenser (7), liquefier/-condenser (8), liquefier/recooler (3) and supercooler first stage (6) and with internal injection valve (2) of different design.
Figure 8:
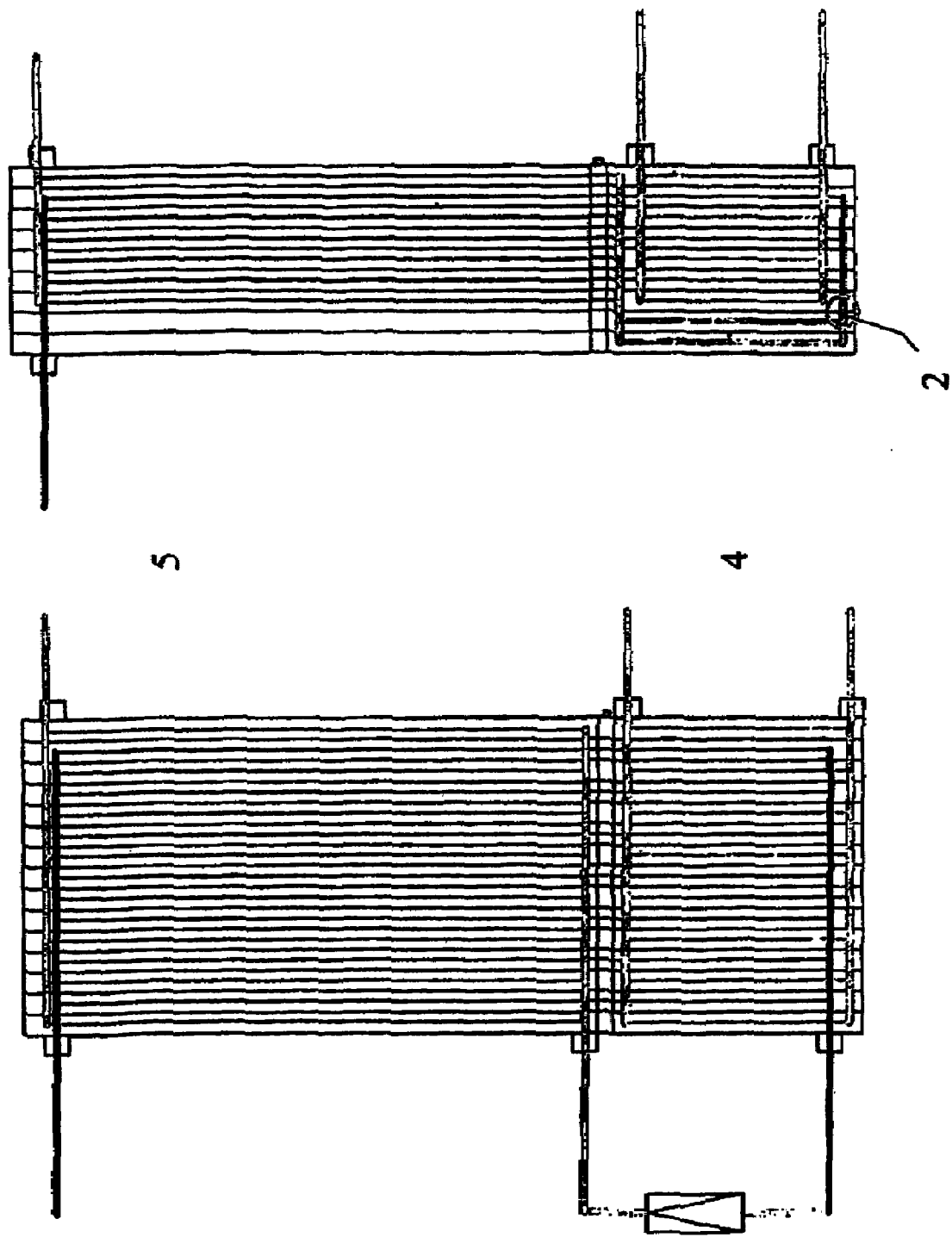
FIG. 8: A two-stage plate-type evaporator (4/5) with integrated liquid supercooling (5) and suction steam superheating (5) with external or internal injection valve (2).
Figure 9:
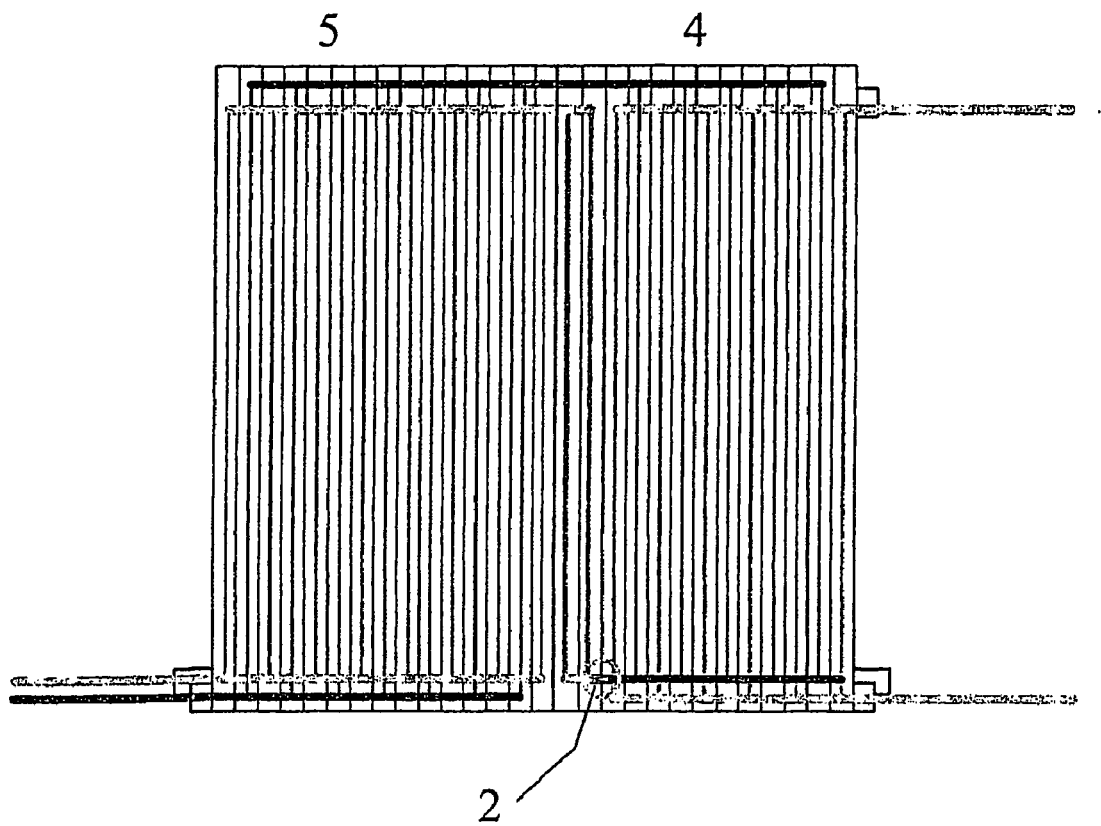
FIG. 9: A two-stage plate-type evaporator (4/5) with integrated liquid supercooling (5) and suction steam superheating (5) with external or internal injection valve (2) of different design.

At the minimum, the following components (in accordance with drawing FIG. 1) are sufficient to construct a module (11): refrigerant compressor (1), liquefier (3), two-stage evaporator with integrated liquid supercooler/suction steam superheater (4/5), injection valve (2), refrigerant, auxiliary refrigeration substances (9), frequency converter (FIGS. 4; 10), lines and electrical control means.

Figure 2:
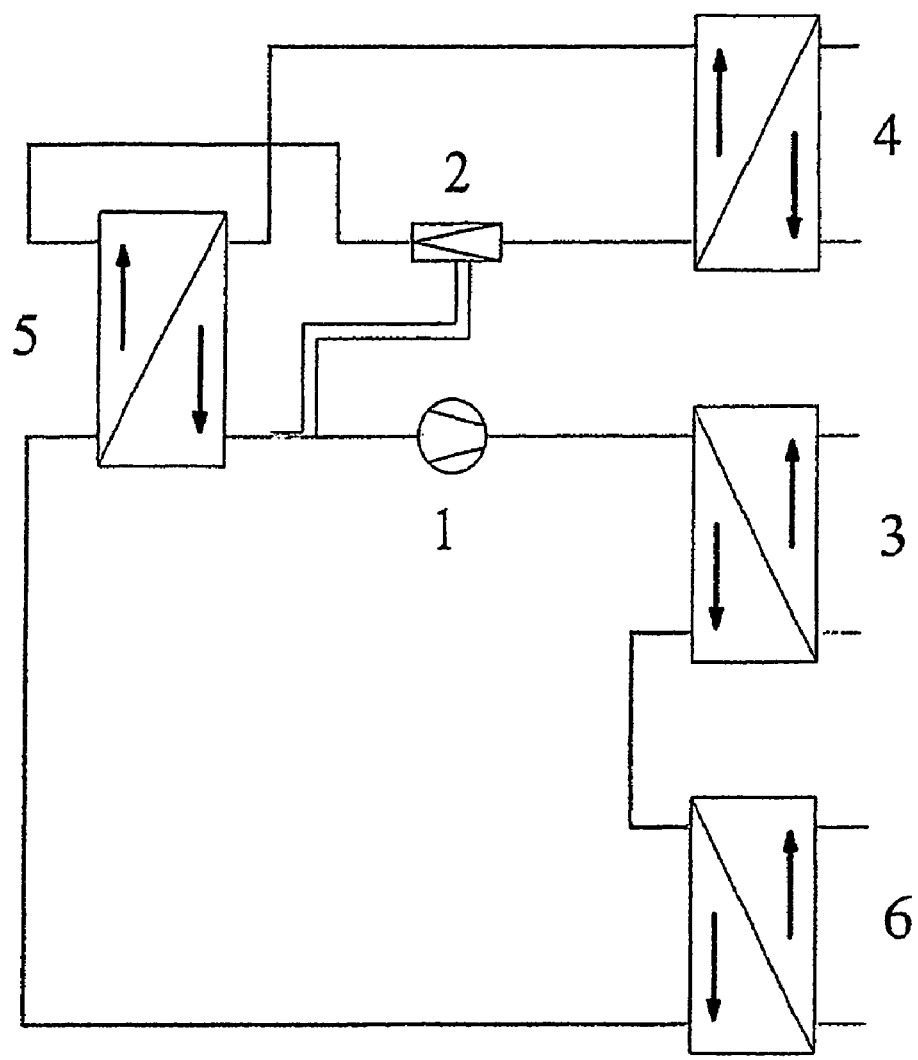
FIG. 2: Minimum possible solution with two-stage supercooling (6/5)

A significant increase in power is achieved by connecting one or more supercooling stages (FIGS. 2; 6) upstream of the integrated supercooler (5).

Figure 3:
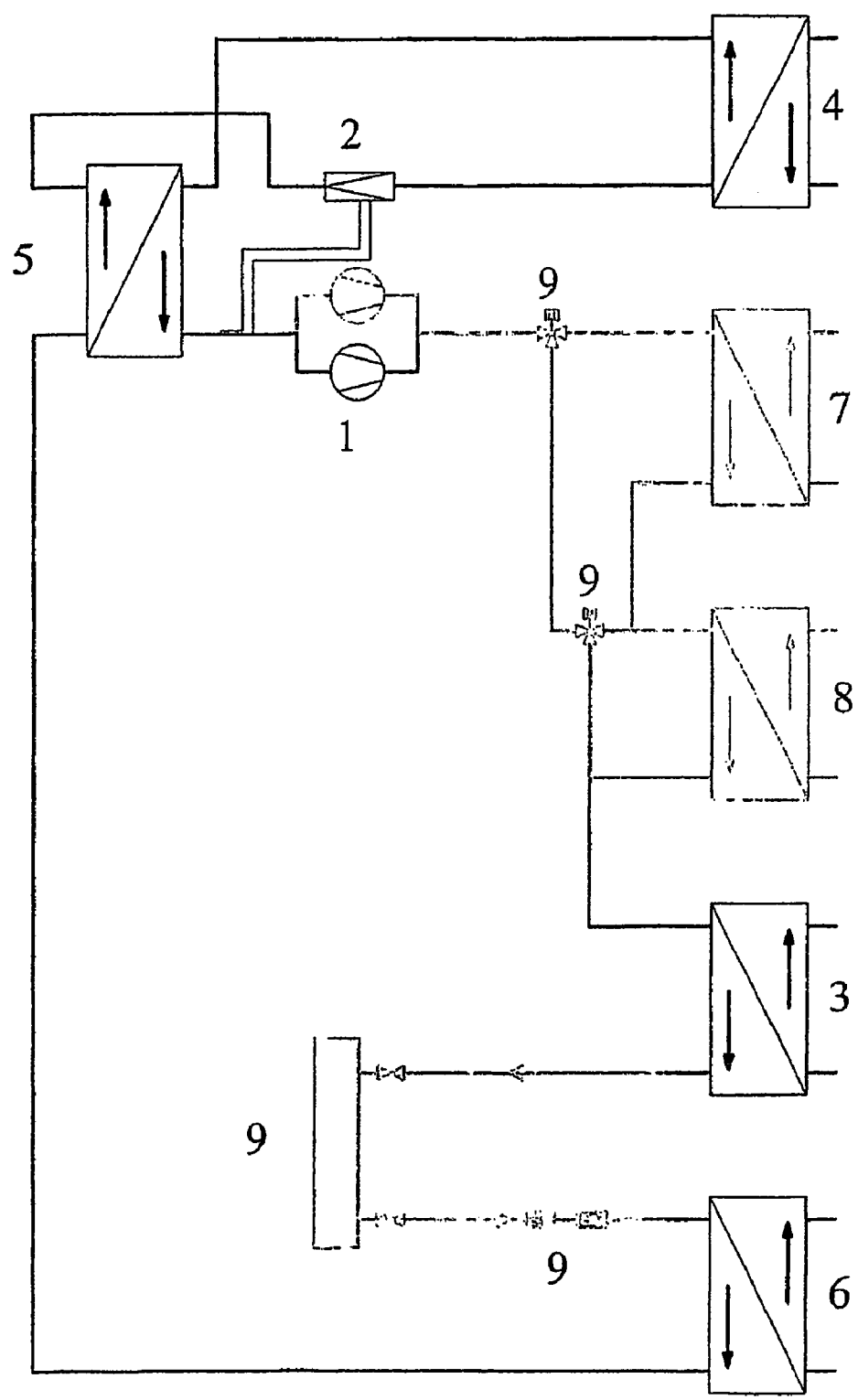
FIG. 3: Possible additional components per module (7/8/9, list not exhaustive)

All other combinations of components (drawing FIGS. 3 and 4 as example) serve only to adapt to specific refrigeration processes and are considered to be known and to form part of the prior art.

Figure 10:
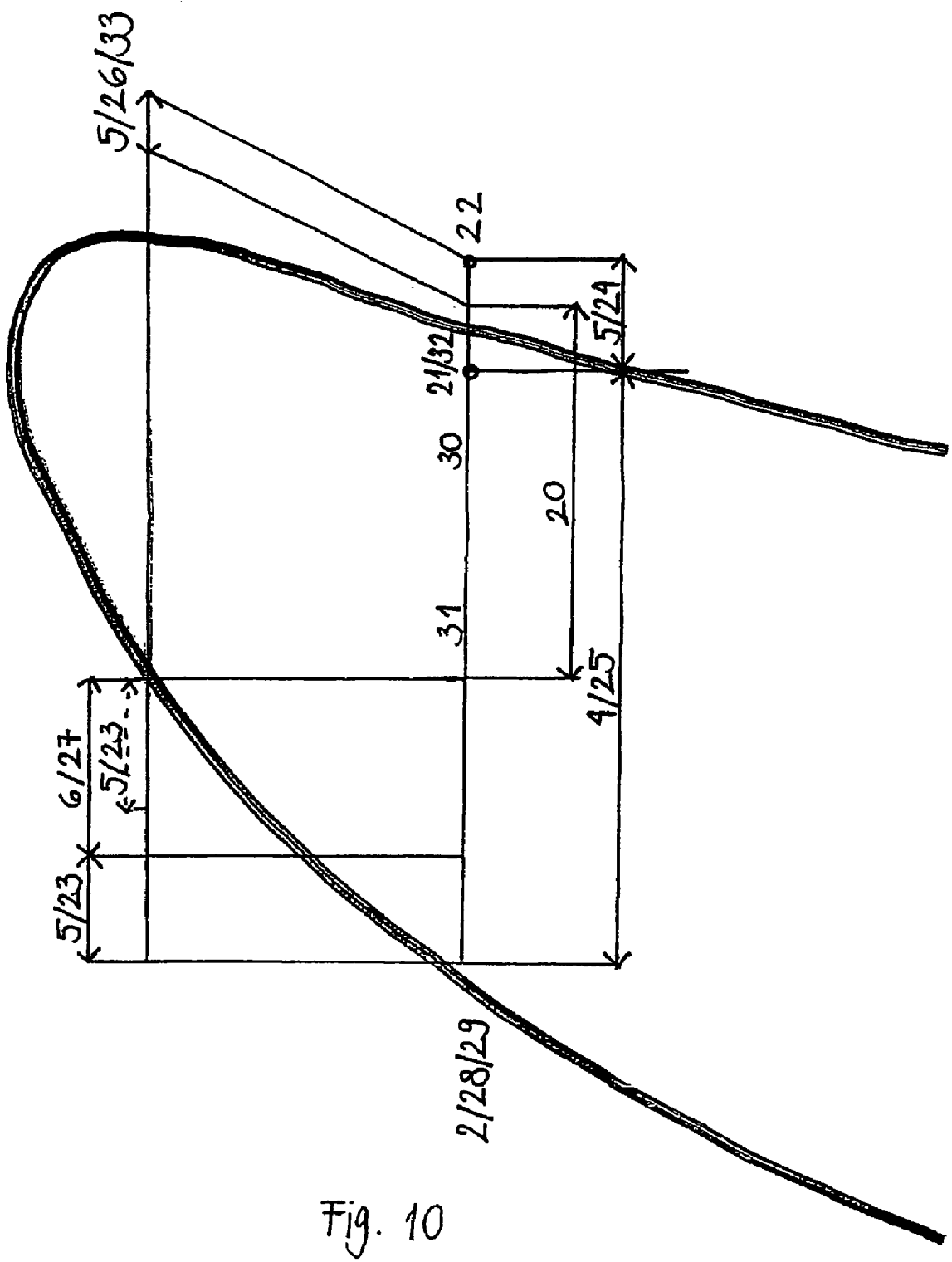
FIG. 10: Diagram illustrating the physical relationships.

A liquid fraction on the evaporator side in the second stage (5/32) directly influences the level of supercooling in the second stage (5/23) of the refrigerant liquid. The process is designed in such a way that the power maximum is always to the benefit of the evaporation stage 1 (4/25), i.e. of the medium that is to be cooled (cf. diagram in FIG. 10).

There is provision for operation with storage of the supercooling energy (FIGS. 4; 12), in which only the internal supercooler stage (stage two) (5/23/24) is used and operation for peak load, in which the stored supercooler energy (12/27) can be deployed for liquid supercooling stage one (6/27) (liquid supercooling stage two (5/23/24) remains in operation) and therefore alone or together with the frequency conversion (FIGS. 4; 10) to cover a peak load.

The invention claimed is:

1. A refrigeration plant of modular design comprising: one or more liquefiers, supercoolers, two-stage evaporators with integrated liquid supercooler and suction steam superheater, injection valves, refrigerant compressors, frequency converters, lines, refrigerant and auxiliary refrigeration substances, wherein on account of the modular design reliability of the refrigeration system is high, the refrigerant compressor covers peak power by means of a frequency conversion, power of the refrigerant compressors is increased by the two-stage evaporator with multistage supercooling and suction steam superheating, energy for refrigeration generation is saved and shifted, and high operational reliability and availability of the refrigeration energy are achieved.

2. The refrigeration plant as claimed in claim 1, wherein a module comprises one refrigerant compressor, one liquefier, one two-stage evaporator with integrated liquid supercooler and suction steam superheater, one injection valve, lines, auxiliary refrigeration substances and refrigerant filling.

3. The refrigeration plant as claimed in claim 1, wherein a supercooler is connected upstream of the two-stage evaporator with integrated liquid supercooler and suction steam superheater.

4. The refrigeration plant as claimed in claim 1, wherein one or more condensers/liquefiers for waste heat utilization is connected downstream of the refrigerant compressor.

5. The refrigeration plant as claimed in claim 1, wherein a module or a plurality of modules are assembled in parallel to form a refrigeration system.

6. The refrigeration plant as claimed in claim 1, wherein the refrigerant compressor delivers a mass flow required for a defined refrigeration power via the frequency converter.

7. The refrigeration plant as claimed in claim 1, wherein the supercooler is connectable as a function of a demand for refrigeration.

8. The refrigeration plant as claimed in claim 1, wherein the refrigeration energy for the supercooler is temporarily stored.

9. The refrigeration plant as claimed in claim 1, wherein the refrigeration energy for the supercooler originates from independent sources.

10. The refrigeration plant as claimed in claim 1, wherein the modular design requires only a small number of items of equipment and auxiliary refrigeration substances.

11. The refrigeration plant as claimed in claim 1, wherein the modular design requires only a small quantity of refrigerant.

12. The refrigeration plant as claimed in claim 1, wherein there is no significant pressure drop in the refrigeration line.

13. The refrigeration plant as claimed in claim 1, wherein the two-stage evaporator with multistage supercooling and suction steam superheating is also used as a separate unit in all other refrigeration plants.

14. The refrigeration plant as claimed in claim 1, wherein refrigeration powers and a ratio of energy input to energy output are significantly greater at the refrigerant compressors.

15. A method for operating a refrigeration plant of modular design as set forth in claim 1, comprising the step of flowing a refrigeration-transfer medium on one side through a first stage of the two-stage evaporation with multistage supercooling and suction steam superheating.

16. A method for operating a refrigeration plant of modular design as set forth in claim 1, comprising the step of flowing a refrigeration-transfer medium through the liquefier/recooler.

17. A method for operating a refrigeration plant of modular technology as set forth in claim 1, comprising the step of passing a refrigerant through one or more refrigerant compressors, liquefiers, supercoolers, two-stage evaporators with liquid supercooling and suction steam superheating via injection member(s), through the two-stage evaporator with liquid supercooling and suction steam superheating back to the refrigerant compressor, thereby maintaining a cycle.

18. A method for operating a refrigeration plant of modular technology as set forth in claim 1, comprising the step of maintaining an evaporation temperature, on account of the use of the two-stage evaporator with multistage supercooling and suction steam superheating, close to an outlet temperature of a medium that is to be cooled, and consequently similar to that achieved in thermosyphon operation and better than that achieved in dry expansion operation.

19. A method for operating a refrigeration plant of modular technology as set forth in claim 1, comprising the step of causing a level of suction steam superheating up to a usable limit of the refrigerant compressor by a use of the two-stage evaporator with multistage supercooling and suction steam superheating.

20. A method for operating a refrigeration plant of modular technology as set forth in claim 1, comprising the step of a defined power always maintaining an identical mass flow through the two-stage evaporator with liquid supercooling and suction steam superheating on both refrigerant sides.

21. A method for operating a refrigeration plant of modular technology as set forth in claim 1, comprising the step of creating a direct link and an optimum for an evaporator power of a first evaporator stage taking account of supercooling upstream of the injection valve and the liquid fraction in the refrigerant at the outlet from the first evaporator stage, which is simultaneously the inlet to a second evaporator stage.

22. A method for operating a refrigeration plant of modular design as set forth in claim 1, comprising the step of providing operation with two-stage or multistage supercooling and operation only with internal supercooling.

* * * * *